（12）United States Patent
Hashizume et al.

(10) Patent No.: US 6,965,455 B2
(45) Date of Patent: Nov. 15, 2005

(54) IMAGE READING DEVICE

(75) Inventors: Yusuke Hashizume, Tokyo (JP);
Takaharu Ouchi, Kawasaki (JP)

(73) Assignees: Kabushiki Kaisha Toshiba, Tokyo
(JP); Toshiba Tec Kabushiki Kaisha,
Tokyo (JP)

( * ) Notice: Subject to any disclaimer, the term of this patent is extended or adjusted under 35 U.S.C. 154(b) by 920 days.

(21) Appl. No.: 09/791,768

(22) Filed: Feb. 26, 2001

(65) Prior Publication Data
US 2002/0118405 A1 Aug. 29, 2002

(51) Int. Cl.$^7$ .............................. H04N 1/00; H04N 1/46
(52) U.S. Cl. .................. 358/1.9; 358/505; 358/509
(58) Field of Search .................. 358/421, 401, 358/412, 418, 419, 420, 486, 497

(56) References Cited
U.S. PATENT DOCUMENTS 5,583,620 A * 12/1996 Miyamoto .................. 399/208
6,341,103 B1 * 1/2002 Takeda et al. ........... 369/30.15

FOREIGN PATENT DOCUMENTS

JP   2000-101791   4/2000

* cited by examiner

Primary Examiner—Kimberly Williams
Assistant Examiner—Charlotte M. Baker
(74) Attorney, Agent, or Firm—Foley & Lardner LLP

(57) ABSTRACT

The image scanning apparatus capable of reading an image by scanning a carriage equipped with a light source, mirrors and the like in a sub-scanning direction of an original document O, is provided, and in this apparatus, the stepping motor is used to drive the carriage, and an open loop control and switching of the exciter are carried out. With this structure, the scanning speed of the carriage can be increased to be higher than the set speed once, and then reduced to the set speed, thus making it possible to shorten the time for the carriage to move from the home position to the top of the document to be scanned, while suppressing the load on the CPU.

25 Claims, 4 Drawing Sheets

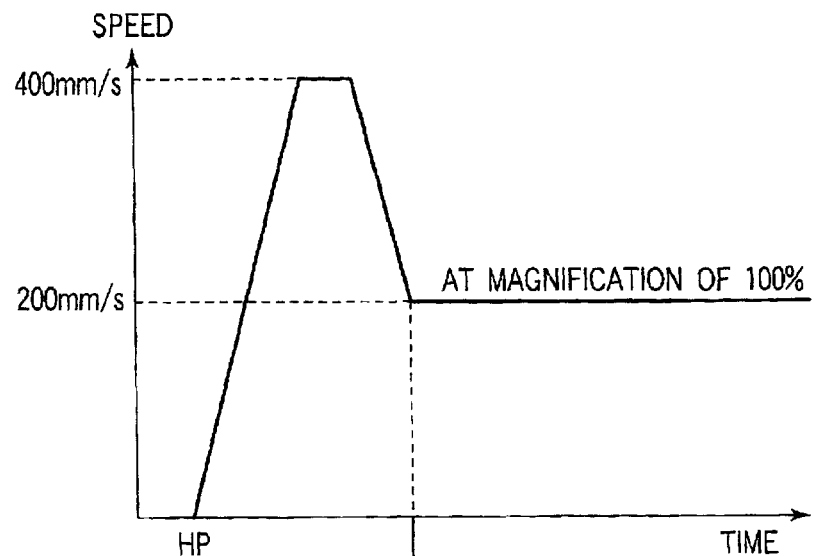
FIG. 5A
FIG. 5B
FIG. 5C
FIG. 5D
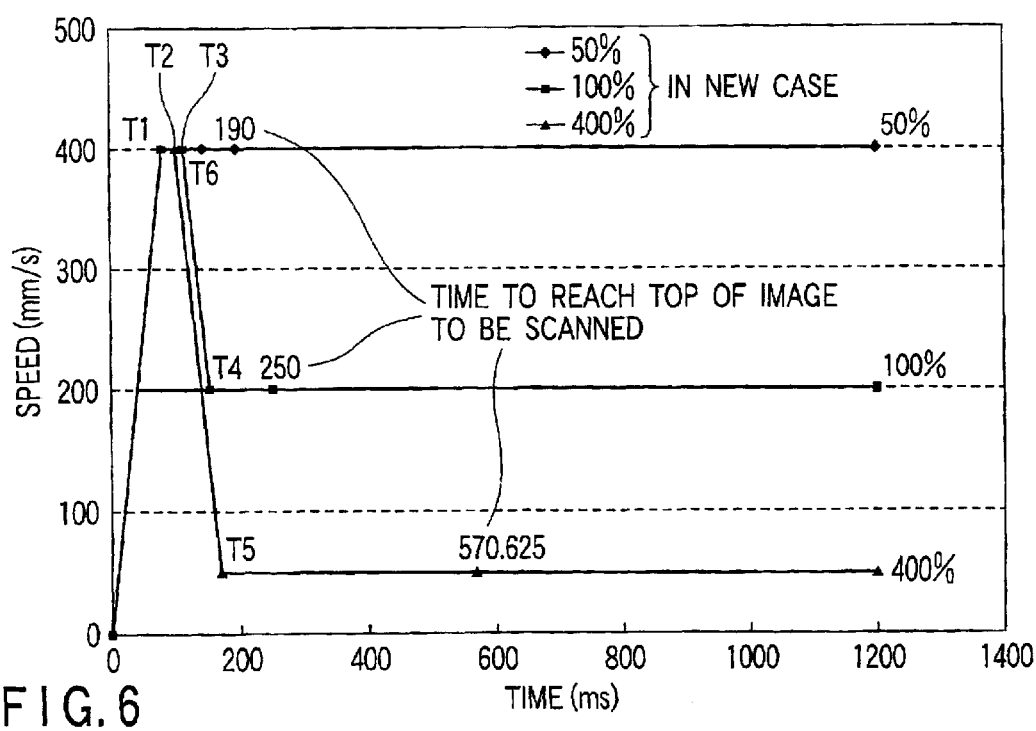
FIG. 6

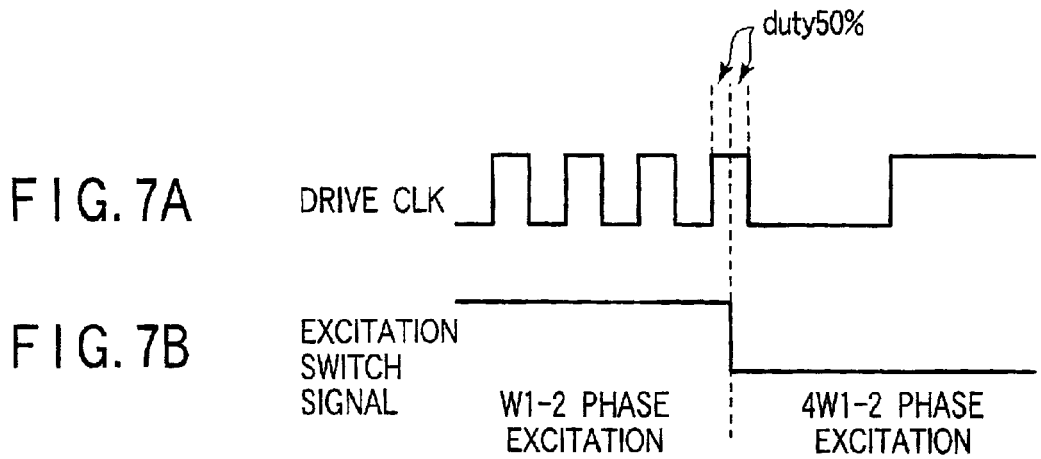
FIG. 7A DRIVE CLK
FIG. 7B EXCITATION SWITCH SIGNAL — W1-2 PHASE EXCITATION / 4W1-2 PHASE EXCITATION
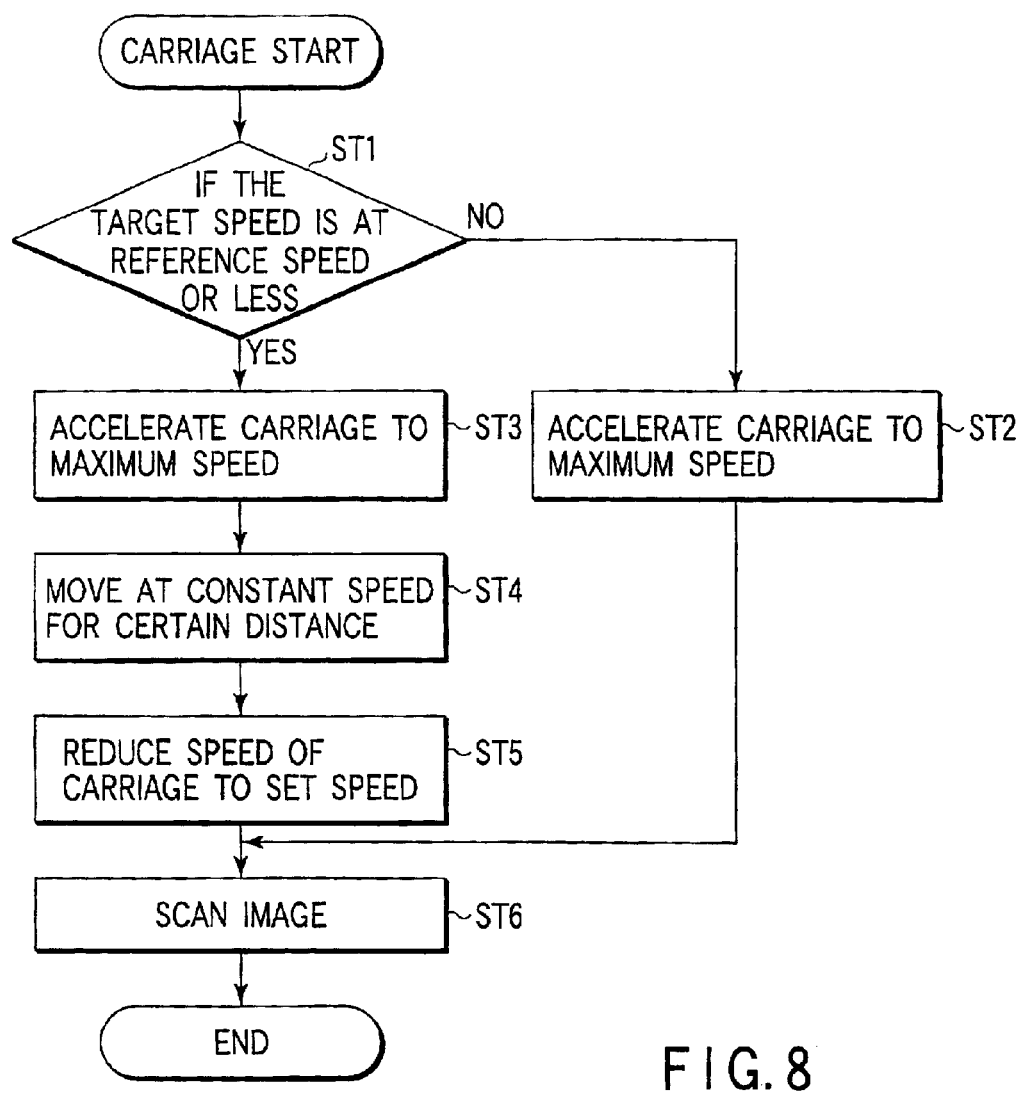
FIG. 8

IMAGE READING DEVICE

BACKGROUND OF THE INVENTION

The present invention relates to an image scanning device which irradiates light from a light source which can move along a document table onto a document sheet placed on the document table, and outputs an electric signal corresponding to the reflection light.

Conventionally, a scanner which irradiates light from a light source provided in a scanning unit which can move along a document table onto a document sheet placed on the document table, and outputs an electric signal corresponding to the reflection light by a CCD line sensor, is put to practical use.

In such a scanner, the light source is moved from its home position over a read area of the document sheet placed on the document table in the sub-scanning direction of the document by means of a carriage. During the scanning, the moving speed of the carriage varies depending upon the magnification by which the original copy is read.

Let us take examples where an original document is read at read magnifications varying from, for example, 50% to 400%. The moving speed of the carriage when the read magnification is 50%, 100% or 400%, will now be described with reference to FIG. 1.

When the read magnification is 50%, the movement of the carriage is accelerated (for time T3) from the home position HP until it reaches a moving speed 1 (in this example, 400 mm/s) for reading the original document at a read magnification of 50%. Then, while the speed 1 is maintained, the carriage passes the image scan start position (that is, light irradiation start position) on the document table, and thus the image on the sheet placed on the document table is read.

When the distance from the home position to the image scan start position is set to 60 mm, the carriage reaches the image scan start position in 190 ms as shown in FIG. 1.

When the read magnification is 100%, the movement of the carriage is accelerated (for time T2) from the home position HP until it reaches a moving speed 2 (in this example, 200 mm/s, which is ½ of the moving speed 1) for reading the original document at a read magnification of 100%. Then, while the speed 2 is maintained, the carriage passes the image scan start position (that is, light irradiation start position) on the document table, and thus the image on the sheet placed on the document table is read.

When the distance from the home position to the image scan start position is set to 60 mm, the carriage reaches the image scan start position in 320 ms as shown in FIG. 1.

When the read magnification is 400%, the movement of the carriage is accelerated (for time T1) from the home position HP until it reaches a moving speed 3 (in this example, 50 mm/s, which is ⅛ of the moving speed 1) for reading the original document at a read magnification of 400%. Then, while the speed 3 is maintained, the carriage passes the image scan start position (that is, light irradiation start position) on the document table, and thus the image on the sheet placed on the document table is read.

When the distance from the home position to the image scan start position is set to 60 mm, the carriage reaches the image scan start position in 1205 ms as shown in FIG. 1.

As described above, the moving speed of the carriage increases from the home position HP and reaches the level which corresponds to a respective magnification for reading an original document. Then, the moving speed is maintained at that level to the image scan start position on the document table. For example, as the read magnification increases from 50%, the moving speed is decreased. More specifically, as compared to the case where the read magnification is 50%, the moving speed becomes ½ of that of the case where the read magnification is 100%, or it becomes ⅛ of that of the case where the magnification is 400%.

As a result, when the read magnification is increased, it takes more time to move the carriage from the home position HP to the image scan start position on the sheet table, that is, taking up a great amount of time in image scanning.

BRIEF SUMMARY OF THE INVENTION

The present invention has been proposed in consideration of the above-described drawback, that is, taking up a great amount of time in image scanning, and the object thereof is to provide an image scanner for scanning an original document on a document table with an optical system movable along the sheet at various magnifications, which can shorten the time required to scan an image.

According to the present invention, there is provided an image scanning device for scanning an image on an original document placed on a document table, by using light irradiation means scanned along the document table, the image scanning device comprising:

a stepping motor for moving the light irradiation means with use of either one of first and second phase exciters of different excitation modes;

reception means for receiving a scanning magnification for the image of the original document, supplied from an external device;

first movement means for controlling the stepping motor to move the light irradiation means as accelerating it to a moving speed based on a minimum scanning magnification for the image of the original document, from an initial position located outside a document scanning region of the document table to a first predetermined position, by excitation of the first phase exciter;

second movement means for controlling the stepping motor to move the light irradiation means at the moving speed based on the minimum scanning magnification for the image of the original document, from the first predetermined position to a second predetermined position located outside the document scanning region of the document table by excitation of the first phase exciter;

third movement means for controlling the stepping motor to move the light irradiation means as decelerating it to the moving speed based on the scanning magnification, if the received scanning magnification is that other than the minimum scanning magnification for the image of the original document, or as maintaining the moving speed based on the scanning magnification if the received scanning magnification is the minimum scanning magnification, from the second predetermined position to a third predetermined position located outside a document scanning region of the document table, which varies its position depending on the scanning magnification of the image of the original document, by excitation of the first phase exciter;

fourth movement means for controlling the stepping motor to move the light irradiation means at the moving speed based on the scanning magnification, from the third predetermined position to a light irradiation start position of the document table and from the light irradiation start position of the document table to an end portion of the original document on the document table by excitation of the second phase exciter; and photoelectric conversion means for converting an amount of reflection light while irradiating the original document on the document table by the light irradiating means moved by the fourth moving means, into an electric signal.

There is further provided an image scanning device for scanning an image on an original document placed on a document table, by using light irradiation means scanned along the document table, the image scanning device comprising:

a stepping motor for moving the light irradiation means with use of either one of first and second phase exciters of different excitation modes;

reception means for receiving a scanning magnification for the image of the original document, supplied from an external device;

identifying means for identifying an end portion of the original document, which faces a light irradiation start position on the document table, by detecting a size of the original document placed on the document table;

first movement means for controlling the stepping motor to move the light irradiation means as accelerating it to a moving speed based on a minimum scanning magnification for the image of the original document, from an initial position located outside a document scanning region of the document table to a first predetermined position, by excitation of the first phase exciter;

second movement means for controlling the stepping motor to move the light irradiation means at the moving speed based on the minimum scanning magnification for the image of the original document, from the first predetermined position to a second predetermined position located outside the document scanning region of the document table by excitation of the first phase exciter;

third movement means for controlling the stepping motor to move the light irradiation means as decelerating it to the moving speed based on the scanning magnification, if the received scanning magnification is that other than the minimum scanning magnification for the image of the original document, or as maintaining the moving speed based on the scanning magnification if the received scanning magnification is the minimum scanning magnification, from the second predetermined position to a third predetermined position located outside a document scanning region of the document table, which varies its position depending on the scanning magnification of the image of the original document, by excitation of the first phase exciter;

fourth movement means for controlling the stepping motor to move the light irradiation means at the moving speed based on the scanning magnification, from the third predetermined position to a light irradiation start position of the document table and from the light irradiation start position of the document table to an end portion of the original document on the document table by excitation of the second phase exciter; and photoelectric conversion means for converting an amount of reflection light while irradiating the original document on the document table by the light irradiating means moved by the fourth moving means, into an electric signal.

There is further provided an image scanning device for scanning an image on an original document placed on a document table, by using light irradiation means scanned along the document table, the image scanning device comprising:

a stepping motor for moving the light irradiation means with use of either one of first and second phase exciters of different excitation modes;

reception means for receiving a scanning magnification for the image of the original document, supplied from an external device;

first movement means for controlling the stepping motor to move the light irradiation means as accelerating it to a moving speed based on a minimum scanning magnification for the image of the original document, from an initial position located outside a document scanning region of the document table to a first predetermined position, by excitation of the first phase exciter;

second movement means for controlling the stepping motor to move the light irradiation means at the moving speed based on the minimum scanning magnification for the image of the original document, from the first predetermined position to a second predetermined position located outside the document scanning region of the document table by excitation of the first phase exciter;

third movement means for controlling the stepping motor to move the light irradiation means as decelerating it to the moving speed based on the scanning magnification, if the scanning magnification is that other than the minimum scanning magnification for the image of the original document, or as maintaining the moving speed based on the scanning magnification when the scanning magnification is the minimum scanning magnification, from the second predetermined position to a third predetermined position located outside a document scanning region of the document table, which varies its position depending on the scanning magnification of the image of the original document, by excitation of the first phase exciter;

fourth movement means for controlling the stepping motor to move the light irradiation means at the moving speed based on the scanning magnification, from the third predetermined position to a light irradiation start position of the document table by excitation of the second phase exciter;

fifth movement means for controlling the stepping motor to move the light irradiation means at the moving speed based on the scanning magnification, from the light irradiation start position on the document table to an end portion of the original document on the document table by excitation of the second phase exciter; and photoelectric conversion means for converting an amount of reflection light while irradiating the original document on the document table by the light irradiating means moved by the fifth moving means, into an electric signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A is a diagram illustrating a change in speed of the movement of the carriage;

FIG. 5B is a diagram illustrating switch-over of excitation phase during the movement of the carriage;

FIG. 5C is a diagram illustrating a change in current during the movement of the carriage;

FIG. 5D is a diagram illustrating the frequency of a drive clock;

FIG. 6 is a diagram illustrating a change in speed of the movement of the carriage at various magnifications;

FIG. 7A is a diagram showing a drive clock;

FIG. 7B is a diagram illustrating the timing for switching the excitation by an excitation switching signal; and FIG. 8 is a flowchart illustrating the speed control of the carriage by the stepping motor.

DETAILED DESCRIPTION OF THE INVENTION

An embodiment of the present invention will now be described with reference to accompanying drawings.

Figure 1:
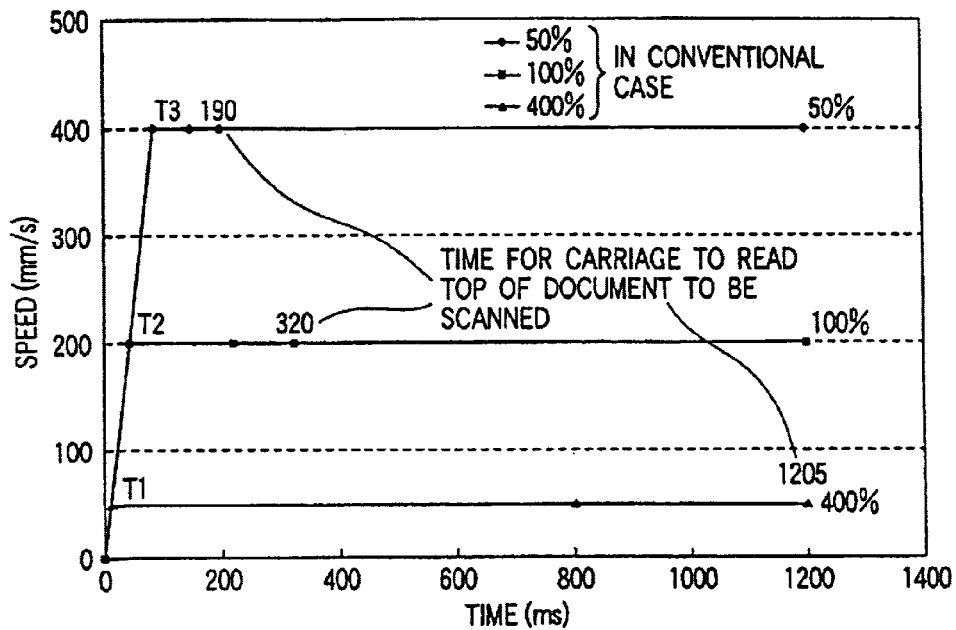
FIG. 1 is a diagram illustrating the change in speed of the movement of the carriage at various magnifications in the conventional case.
Figure 2:
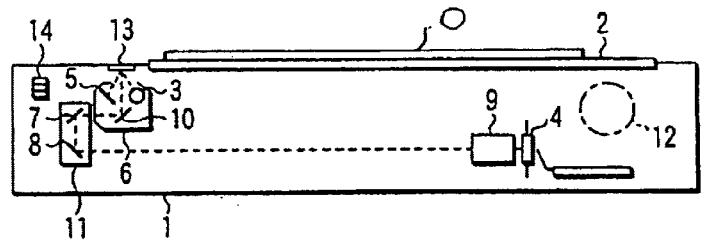
FIG. 2 is a diagram briefly illustrating an internal structure of an image scanning apparatus of the present invention.
Figure 3:
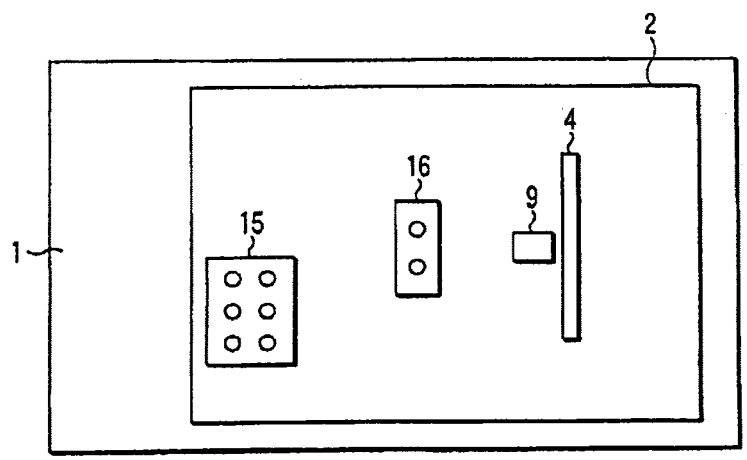
FIG. 3 is a diagram briefly illustrating an internal structure of an image scanning apparatus of the present invention, when viewed from top.

FIGS. 2 and 3 are diagrams briefly showing the internal structure of an image scanning apparatus according to the present invention.

A scanner 1 serving as the image scanning apparatus is designed to optically scan image data on an original document.

The scanner 1 includes an original sheet table 2 on which an original document O to be copied is placed, a light source (halogen lamp, fluorescent light, xenon lamp, etc.) for irradiating light onto the original document O placed on the table 2, and a CCD line sensor 4 for photo-electrically converting reflection light from the original document O irradiated by the light source 3 through the sheet table 2, so as to convert the reflection light into an image data signal.

On a side of the light source 3, a reflector 5 is provided for converging irradiating light from the light source 3 onto the original document O efficiently. Further, between the light source 3 and the CCD line sensor 4, a plurality of mirrors 6, 7 and 8 for bending a light path through which light directed from the original document towards the CCD line sensor 4, that is, the reflection light from the original sheet O, passes, a lens 9 for converging the reflection light on a light converging surface of the CCD line sensor 4, etc. are provided.

The original document O placed on the table is scanned by exposing light thereto while the scanning system consisting of the light source 3 and the mirrors 6, 7 and 8 moves back and forth in a direction indicated by an arrow a along a lower surface of the document table 2. During the scanning, the mirrors 7 and 8 move at half a speed of that of the mirror 6 such as to maintain the length of the optical path. The reflection light from the original document, resulting from the scanning operation by the scanning system, that is, the reflection light from the original document resulting from the irradiation light from the light source 3, is reflected by the mirrors 6, 7 and 8, and then allowed to pass through the lens 9. After that, the light is guided by the CCD line sensor 4, and eventually, the image of the original document O is formed on the surface of the CCD line sensor 4.

The scanning unit consists of the light source 3, the mirrors 6, 7 and 8, the lens 9 and the CCD line sensor 4.

The light source 3, the mirror 6 and the reflector 5 are provided on the first carriage 10, and the mirrors 7 and 8 are provided on the second carriage 11. These carriages 10 and 11 are moved independently by the stepping motor 12.

Near the document table 2, a white reference plate 13 is provided for generating a white reference signal used for shading correction. To the white reference plate 13, light from the light source 3 is irradiated prior to the scanning of the original document, and the reflection light is guided to the CCD line sensor 4.

Near the white reference plate 13, a home position sensor 14 for detecting that the first carriage 10 is situated at the home position HP is provided.

Underneath the document table 2, document size detection sensors 15 and 16 for detecting the size of the original document placed on the document sheet 2, are provided.

Near the CCD line sensor 4 underneath the document table 2, a control circuit for controlling the entire scanner is provided.

Over the document table 2, a document presser for holding an original document O such as described above tightly on the document table 2. It should be noted that the document presser can be replaced by an SDF (semi-automatic document feeder) or an ADF (automatic document feeder).

Figure 4:
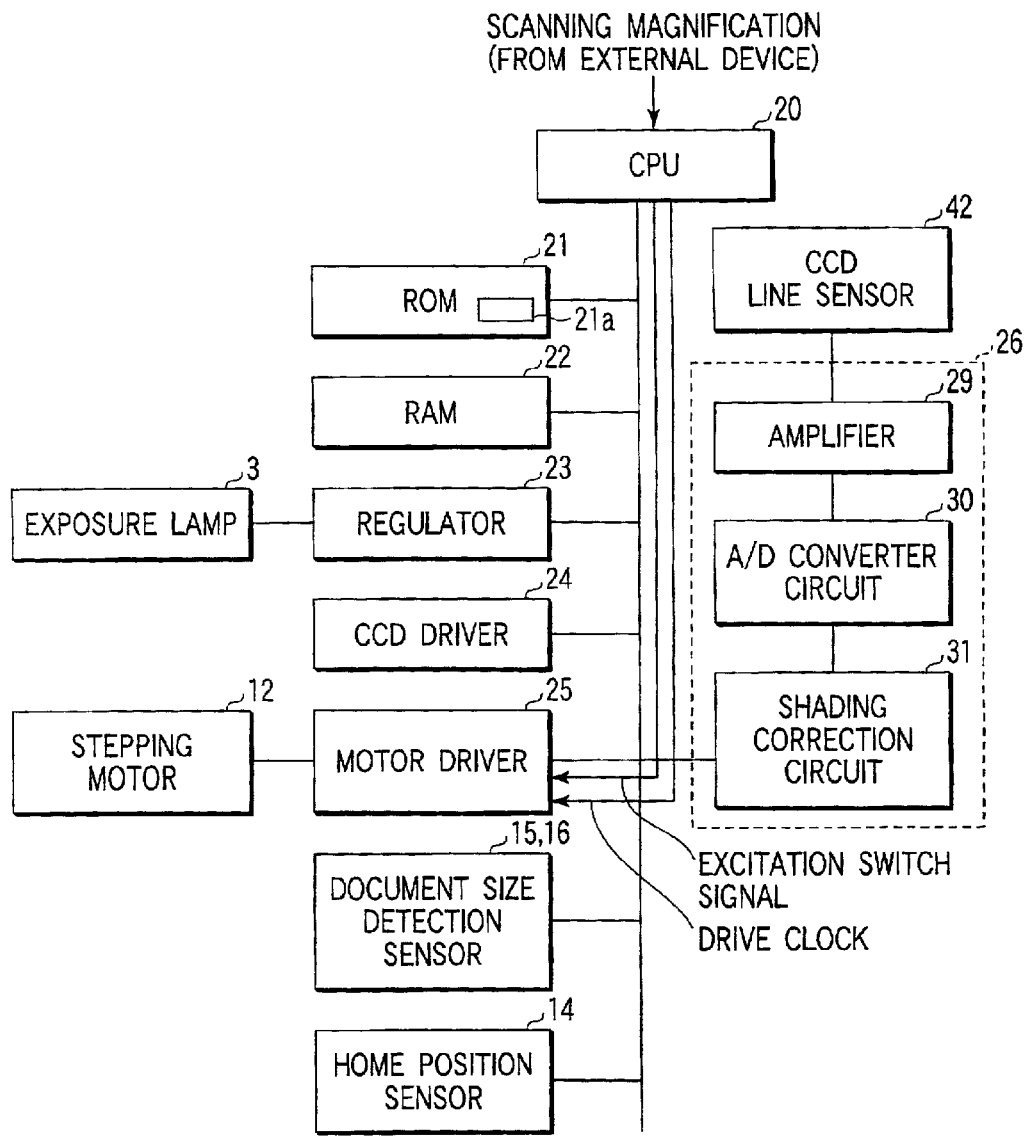
FIG. 4 is a diagram briefly illustrating a structure of a control circuit of a scanner.

FIG. 4 is a diagram showing the structure of the control circuit 17 of the scanner 1.

As shown, the control circuit 17 of the scanner 1 consists of a CPU 20 for controlling the entire circuit, a ROM 21 in which control programs, etc. are stored, a RAM 22 for recording various data, a regulator 23 for controlling ON/OFF and the intensity of the light source 3, a CCD driver 24 for driving the CCD line sensor 4, a motor driver 25 for driving the stepping motor 12 which moves the first and second carriages 10 and 11, and an image processing circuit 26 for processing signals from the CCD line sensor 4.

To the CPU 20, the home position sensor 14, the document size detection sensors 15 and 16 are connected.

The image processing circuit 26 consists of an amplifier 29 for amplifying an analog signal supplied from the CCD line sensor 4, an A/D converter circuit 30 for converting the analog signal amplified by the amplifier 29 into a digital signal, and a shading correction circuit 31 for correcting an electric signal from the CCD line sensor 4, caused by irregular light irradiation by the light source 3, a change in temperature of the surroundings, etc., with use of a shading correction value (reference signal).

The shading correction value is a value used for correcting variation of a signal from the CCD line sensor 4, contained in an electric signal from the CCD line sensor 4, which is caused by irregular irradiation by, for example, the light source 3 or a change in temperature of the surrounding environment. The correction value is obtained before scanning the original document placed on the document table 2, from the electric signal from the CCD line sensor 4, generated on the basis of the amount of reflection light from the white reference plate 13.

A drive clock and an excitation switch signal, of two respect types of frequencies, are supplied from the CPU 20 to the stepping motor 12.

The stepping motor 12 operates on the basis of the excitation switch signal and drive clock from the CPU 20, and it is rotated by a W1-2 phase exciter (first phase exciter) or 4W1-2 phase exciter (second phase exciter).

More specifically, as shown in FIGS. 5A, 5B and 5C, the exciter is switched over between the case where the motor is rotated on the basis of the driver clock of the first frequency by the W1-2 phase exciter and the case where it is rotated on the basis of the driver clock of the second frequency (lower than the first frequency) by the 4W1-2 phase exciter.

In the case where the frequency values of the drive clocks are the same (for example, in the case of 10000 pps and 10 kHz as shown in FIG. 5D), the W1-2 phase exciter rotates the motor at a speed four times faster than that of the 4W1-2 phase exciter.

Further, if the excitation mode of the stepping motor 12 is changed, a drive clock of a low frequency can be used in the case of the 4W1-2 phase exciter rather than in the case of the W1-2 exciter.

The difference of these cases is due to the step angle, and more specifically, the W1-2 phase exciter has a step angle of four times as much of that of the 4W1-2 phase exciter. That is, when the frequencies of the drive clocks are the same, the W1-2 phase exciter rotates at a speed four times faster than that of the 4W-1 phase exciter, and accordingly the load on the CPU 20 can be reduced. However, the mechanical load cannot be lightened, and therefore it is necessary to increase the amount of current when the W1-2 phase exciter is used. (See FIGS. 5C and 5D.)

An example where the above-described control method is employed is shown in FIG. 5A. In this example, the magnification is 100% (equal size); however, the carriage is accelerated to the speed 1, and then maintained at the constant speed. After that, the W1-2 phase exciter is used until the speed is reduced to the speed 2, and then the speed is maintained constant at the speed 2 with use of the 4W-1 phase exciter. The timing for switching the exciter (instructed by the exciter switching signal from the CPU 20) may be set at any point as long as the stepping motor is not operated out of synchronization. For example, FIGS. 7A and 7B indicate a case where the timing is set at a point where the duty ratio of the drive clock is 50% (1-to-1 ratio).

The number of pulses used for the speed control for each magnification is registered in the table 21a of the ROM 21.

As the drive clock for the stepping motor 12, the type directly generated from the CPU 20 is used without employing an exclusive-use ASIC, in order to reduce the production cost. In this case, as the frequency becomes higher, the load on the CPU 20 is increased. That is, in the case where the CPU 20 uses an interrupt process for generation of a drive clock, if the interrupt period is 100 μs, the limitation becomes about 10 kHz. Such a drawback can be solved by switching the excitation mode.

Next, with the above-described structure, the speed control of the carriage 10 by the stepping motor 12 from the home position HP to the image scan start portion on the document table 2 for various scanning magnification, will now be described in detail with reference to a flowchart shown in FIG. 8 and a diagram indicating a change in speed of the carriage 10, shown in FIG. 6.

In the description which will be provided, the distance between the home position and the image scan start position is set to 60 mm, and a section required to stabilize the movement of the carriage 10 in reduction of speed and completion of the excitation switch until the image scan start position is supposed to be 20 mm.

More specifically, when the CPU 20 judges that the scanning magnification instructed from an external device (such as a personal computer or printer, not shown in the figure) is 50%, and the target speed is at a reference speed (maximum speed) (ST1), the CPU 20 controls the device in the following manner. That is, on the basis of the number of pulses of the speed control for a scanning magnification of 50%, read from the table 21a, the carriage 10 starts from the home position HP and accelerates until it reaches the moving speed 1 (maximum speed, 400 mm/sec in this example) (that is, position X1, the first predetermined position) for the case of scanning a document at a scanning magnification of 50%, and then while the speed 1 is maintained, the carriage passes the image scan start position (light irradiation start position) on the document table 2 and then carries out image scanning of the original document placed on the document table 2 (ST2).

In the above-described operation, the CPU 20 instructs, while controlling the movement of the carriage from the home position HP to the time T6 (the second predetermined position), that the stepping motor 12 be rotated by the W1-2 phase exciter on the basis of the drive clock having the first frequency which is lower, and then instructs while controlling the movement of the carriage from the time T6 for an image scanning operation, that the stepping motor 12 be rotated by the 4W1-2 phase exciter on the basis of the drive clock having the second frequency which is higher.

It should be noted that the time T6 is the time for the carriage 10 to reach a position 20 mm before the image scan start position. In this operation, since the control method for the carriage 10 is the same as that of the conventional technique, the time for the carriage 10 to reach the image read scanning position is the same as that of the conventional technique, that is 190 ms.

Further, when the CPU 20 judges that the scanning magnification instructed from an external device (not shown in the figure) is 100%, and the target speed is at a reference speed (maximum speed) or less (ST1), the CPU 20 controls the device in the following manner. That is, on the basis of the number of pulses of the speed control for a scanning magnification of 100, which is read from the table 21a, the carriage 10 starts from the home position HP and accelerates until it reaches the moving speed 1 (maximum speed) (that is, for a time T1) for the case of scanning a document at a scanning magnification of 50% (ST3), and then the speed 1 is maintained to a time T3 (ST4). After that, the speed is reduced until it reaches the moving speed 2 (200 mm/s) (that is, a time T4) for the case of scanning a document at a scanning magnification of 100% (ST5), and then while maintaining the speed 2, the carriage passes the image scan start position (light irradiation start position) on the document table 2 and then carries out image scanning of the original document placed on the document table 2 (ST6).

In the above-described operation, the CPU 20 instructs, while controlling the movement of the carriage from the home position HP to the time T5, that the stepping motor 12 be rotated by the W1-2 phase exciter on the basis of the drive clock having the first frequency which is lower, and then instructs while controlling the movement of the carriage from the time T5 for an image scanning operation, that the stepping motor 12 be rotated by the 4W1-2 phase exciter on the basis of the drive clock having the second frequency which is higher.

It should be noted that the time T5 is the time for the carriage 10 to reach a position 20 mm before the image scan start position. In this operation, the time for the K carriage 10 to reach the image read scanning position is 570.625 ms, and thus the time can be shortened by 634.375 ms, as compared to 1205 ms of the conventional technique.

Further, when the CPU 20 judges that the scanning magnification instructed from an external device (not shown in the figure) is one ranging from 50% to 400% and other than those already discussed above, and the target speed is lower than the reference speed (maximum speed) (ST1), the CPU 20 controls the device in the following manner. That is, the carriage 10 starts from the home position HP and accelerates until it reaches the moving speed 1 (time T1) for the case of scanning a document at a scanning magnification of 50% (ST3), and then the speed 1 is maintained for a predetermined time period (ST4). Here, the time for maintaining the speed 1 varies depending on the instructed magnification, these time periods are calculated and stored in the table 21 in advance, and thus stored times are used here. After that, the speed is reduced until it reaches the moving speed 2 for the case of scanning a document at the corresponding scanning magnification (ST5), and then while maintaining the speed, the carriage passes the image scan start position (light irradiation start position) on the document table 2 and then carries out image scanning of the original document placed on the document table 2 (ST6).

In the above-described operation, the CPU 20 instructs, while controlling the movement of the carriage from the home position HP to the position corresponding to the moving speed for its document scan, that the stepping motor 12 be rotated by the W1-2 phase exciter on the basis of the drive clock having the first frequency which is lower, and then instructs while controlling the movement of the carriage from that position for an image scanning operation, that the stepping motor 12 be rotated by the 4W1-2 phase exciter on the basis of the drive clock having the second frequency which is higher.

With use of the stepping motor 12 for driving the carriages 10 and 11, an open loop control can be performed. Therefore, it becomes unnecessary to monitor the motor speed in the steps 2 to 5, and thus the load on the CPU 20 can be reduced accordingly.

Further, the CPU 20 judges the size of an original document O on the basis of detection signals from the document size detection sensors 15 and 16. On the basis of this judgment, the CPU 20 makes instructions that the light source 3 be turned off when the scanning of the original document O is finished at its end in the steps 2 and 6, and the carriages 10 and 11 be returned to the home position by reversing the rotation of the stepping motor 12.

As described above, according to the present invention, there is provided an image scanning apparatus capable of reading an image by scanning a carriage equipped with a light source, mirrors and the like in a sub-scanning direction of an original document O, in which the stepping motor is used to drive the carriage, an open loop control and switching of the exciter are carried out. In this manner, the scanning speed of the carriage can be increased to be higher than the set speed once, and then reduced to the set speed, thus making it possible to shorten the time for the carriage to move from the home position to the top of the document to be scanned, while suppressing the load on the CPU.

As described above, in the scanner for scanning an original document on a document table with an optical system which can move along the document, at various magnifications, the time for scanning can be shortened and the load on the CPU can be reduced.

To summarize, the movement time for the carriage which carries the optical system can be shortened by changing the control mode only. Further, with use of the stepping motor for driving the carriage, it becomes unnecessary to monitor the speed of the carriage at all times, thereby enabling the open loop control. Therefore, the load on the CPU can be reduced. Furthermore, with revision of the excitation mode for the stepping motor, the carriage can be operated by a drive clock of a lower frequency, and therefore the load on the CPU can be further reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image scanning device for scanning an image on an original document placed on a document table, by using light irradiation means scanned along the document table, the image scanning device comprising:

a stepping motor for moving the light irradiation means with use of either one of first and second phase exciters which are of different phase excitation modes and which provide different step angles;

reception means for receiving a scanning magnification for the image of the original document, supplied from an external device;

first movement means for controlling the stepping motor to move the light irradiation means by accelerating it to a first moving speed based on a minimum scanning magnification for the image of the original document, from an initial position located outside a document scanning region of the document table to a first predetermined position, said first movement means moving the light irradiation means by rotating the stepping motor by use of a first amount of current by a first step angle by excitation of the first phase exciter by supplying a driving clock of a first frequency to the first phase exciter;

second movement means for controlling the stepping motor to move the light irradiation means at the first moving speed based on the minimum scanning magnification for the image of the original document, from the first predetermined position to a second predetermined position located outside the document scanning region of the document table, said second movement means moving the light irradiation means by rotating the stepping motor by use of the first amount of current by excitation of the first phase exciter by supplying a driving clock of the first frequency to the first phase exciter;

third movement means for controlling the stepping motor to move the light irradiation means by decelerating from the first moving speed based on the scanning magnification, if the received scanning magnification is that other than the minimum scanning magnification for the image of the original document, or by maintaining the first moving speed based on the scanning magnification if the received scanning magnification is the minimum scanning magnification, from the second predetermined position to a third predetermined position located outside a document scanning region of the document table, which varies its position depending on the scanning magnification of the image of the original document, said third movement means moving the light irradiation means by rotating the stepping motor by use of the first amount of current by excitation of the first phase exciter by supplying a driving clock of the first frequency to the first phase exciter;

fourth movement means for controlling the stepping motor to move the light irradiation means at a second moving speed based on the scanning magnification, from the third predetermined position to a light irradiation start position of the document table and from the light irradiation start position of the document table to an end portion of the original document on the document table, said fourth movement means moving the light irradiation means by rotating the stepping motor by use of a second amount of current, smaller than the first amount of current, by a second step angle greater than the first step angle by excitation of the second phase exciter by supplying a driving clock of a second frequency higher than the first frequency to the second phase exciter; and photoelectric conversion means for converting an amount of reflection light while irradiating the original document on the document table by the light irradiating means moved by the fourth moving means, into an electric signal.

2. The image scanning device according to claim 1, wherein the first phase exciter is a W1-2 phase exciter and the second phase exciter is a 4W1-2 phase exciter, a step angle corresponding to the W1-2 phase exciter being four times greater than a step angle corresponding to the 4W1-2 phase exciter.

3. The image scanning device according to claim 1, wherein a frequency of the driving clock corresponding to the first phase exciter is one fourth of a frequency of the driving clock corresponding to the second phase exciter.

4. The image scanning device according to claim 1, wherein the changing of the frequency of the drive clock for the stepping motor is performed at a position where a duty ratio of the drive clock is 1:1.

5. An image scanning device for scanning an image on an original document placed on a document table, by using light irradiation means scanned along the document table, the image scanning device comprising:

a stepping motor for moving the light irradiation means with use of either one of first and second phase exciters which are of different phase excitation modes and which provide different step angles;

reception means for receiving a scanning magnification for the image of the original document, supplied from an external device;

identifying means for identifying an end portion of the original document, which faces a light irradiation start position on the document table, by detecting a size of the original document placed on the document table;

first movement means for controlling the stepping motor to move the light irradiation means by accelerating it to a first moving speed based on a minimum scanning magnification for the image of the original document, from an initial position located outside a document scanning region of the document table to a first predetermined position, said first movement means moving the light irradiation means by rotating the stepping motor by use of a first amount of current by a first step angle by excitation of the first phase exciter by supplying a driving clock of a first frequency to the first phase exciter;

second movement means for controlling the stepping motor to move the light irradiation means at the first moving speed based on the minimum scanning magnification for the image of the original document, from the first predetermined position to a second predetermined position located outside the document scanning region of the document table, said second movement means moving the light irradiation means by rotating the stepping motor by use of the first amount of current by excitation of the first phase exciter by supplying a driving clock of a first frequency to the first phase exciter;

third movement means for controlling the stepping motor to move the light irradiation means by decelerating from the first moving speed based on the scanning magnification, if the received scanning magnification is that other than the minimum scanning magnification for the image of the original document, or by maintaining the first moving speed based on the scanning magnification if the received scanning magnification is the minimum scanning magnification, from the second predetermined position to a third predetermined position located outside a document scanning region of the document table, which varies its position depending on the scanning magnification of the image of the original document, said third movement means moving the light irradiation means by rotating the stepping motor by use of the first amount of current by excitation of the first phase exciter by supplying a driving clock of the first frequency to the first phase exciter;

fourth movement means for controlling the stepping motor to move the light irradiation means at a second moving speed based on the scanning magnification, from the third predetermined position to a light irradiation start position of the document table and from the light irradiation start position of the document table to an end portion of the original document on the document table, said fourth movement means moving the light irradiation means by rotating the stepping motor by use of a second amount of current smaller than the first amount of current by a second step angle greater than the first step angle by excitation of the second phase exciter by supplying a driving clock of a second frequency higher than the first frequency to the second phase exciter; and photoelectric conversion means for converting an amount of reflection light while irradiating the original document on the document table by the light irradiating means moved by the fourth moving means, into an electric signal.

6. The image scanning device according to claim 5, wherein the first phase exciter is a W1-2 phase exciter and the second phase exciter is a 4W1-2 phase exciter, a step angle corresponding to the W1-2 chase exciter being four times greater than a step angle corresponding to the 4W1-2 phase exciter.

7. The image scanning device according to claim 6, wherein a frequency of the driving clock corresponding to the first phase exciter is one fourth of a frequency of the driving clock corresponding to the second phase exciter.

8. The image scanning device according to claim 5, wherein the changing of the frequency of the drive clock for the stepping motor is performed at a position where a duty ratio of the drive clock is 1:1.

9. An image scanning device for scanning an image on an original document placed on a document table, by using light irradiation means scanned along the document table, the image scanning device comprising:

a stepping motor for moving the light irradiation means with use of either one of first and second phase exciters which are of different phase excitation modes and which provide different step angles;

reception means for receiving a scanning magnification for the image of the original document, supplied from an external device;

first movement means for controlling the stepping motor to move the light irradiation means by accelerating it to a first moving speed based on a minimum scanning magnification for the image of the original document, from an initial position located outside a document scanning region of the document table to a first predetermined position, said first movement means moving the light irradiation means by rotating the stepping motor by use of a first amount of current by a first step angle by excitation of the first phase exciter by supplying a driving clock of a first frequency to the first phase exciter;

second movement means for controlling the stepping motor to move the light irradiation means at the first moving speed based on the minimum scanning magnification for the image of the original document, from the first predetermined position to a second predetermined position located outside the document scanning region of the document tables, said second movement means moving the light irradiation means by rotating the stepping motor by use of the first amount of the current by excitation of the first phase exciter by supplying a driving clock of the first frequency to the first phase exciter;

third movement means for controlling the stepping motor to move the light irradiation means by decelerating from the first moving speed based on the scanning magnification, if the scanning magnification is that other than the minimum scanning magnification for the image of the original document, or by maintaining the first moving speed based on the scanning magnification when the scanning magnification is the minimum scanning magnification, from the second predetermined position to a third predetermined position located outside a document scanning region of the document table, which varies its position depending on the scanning magnification of the image of the original document, said third movement means moving the light irradiation means by rotating the stepping motor by use of the first amount of current by excitation of the first phase exciter by supplying a driving clock of the first frequency to the first phase exciter;

fourth movement means for controlling the stepping motor to move the light irradiation means at a second moving speed based on the scanning magnification, from the third predetermined position to a light irradiation start position of the document table, said fourth movement means moving the light irradiation means by rotating the stepping motor by use of a second amount of current, smaller than the first amount of current by a second step angle greater than the first step angle by excitation of the second phase exciter by supplying a driving clock of a second frequency higher than the first frequency to the second phase exciter;

fifth movement means for controlling the stepping motor to move the light irradiation means at the moving speed based on the scanning magnification, from the light irradiation start position on the document table to an end portion of the original document on the document table by excitation of the second phase exciter; and photoelectric conversion means for converting an amount of reflection light while irradiating the original document on the document table by the light irradiating means moved by the fifth moving means, into an electric signal.

10. The image scanning device according to claim 9, wherein the first phase exciter is a W1-2 phase exciter and the second phase exciter is a 4W1-2 phase exciter, a step angle corresponding to the W1-2 phase exciter being four times greater than a step angle corresponding to the 4W1-2 phase exciter.

11. The image scanning device according to claim 9, wherein a frequency of the driving clock corresponding to the first phase exciter is one fourth of a frequency of the driving clock corresponding to the second phase exciter.

12. The image scanning device according to claim 9, wherein the changing of the frequency of the drive clock for the stepping motor is performed at a position where a duty ratio of the drive clock is 1:1.

13. A scanning apparatus for scanning an image on an original document placed on a document table by moving a carriage, comprising:

a stepping motor which drives the carriage with a predetermined phase excitation mode;

means for setting a scanning magnification ratio; and a processing unit which controls said stepping motor in the following manners:

controlling said stepping motor to accelerate the carriage to a first speed faster than a second speed, corresponding to the magnification ratio set by said setting means, with a first phase excitation mode from an initial position to a first position, by rotating the stepping motor by use of a first amount of current by a first step angle in the first phase excitation mode by supplying a driving clock of a first frequency;

controlling said stepping motor to drive the carriage in the first speed with the first phase excitation mode from the first position to a second position by rotating the stepping motor by use of a first amount of current by a first step angle in the first phase excitation mode by supplying a driving clock of the first frequency;

controlling said stepping motor to decelerate the carriage to the second speed with the first phase excitation mode from the second position to a third position by rotating the stepping motor by use of a first amount of current by a first step angle in the first phase excitation mode by supplying a driving clock of the first frequency; and controlling said stepping motor to drive the carriage in the second speed with a second phase excitation mode different from the first phase excitation mode from the third position to a document scanning end position by rotating the stepping motor by use of a second amount of current, smaller than the first amount of current, by a second step angle greater than the first step angle in the excitation of the second phase excitation mode by supplying a driving clock of a second frequency higher than the first frequency.

14. A scanning apparatus according to claim 13, wherein said first phase excitation mode is a W1-2 phase exciter and the second phase excitation mode is a 4W1-2 phase exciter, a step angle corresponding to the W1-2 phase excitation mode being four times greater than a step angle corresponding to the 4W1-2 phase excitation mode.

15. A scanning apparatus according to claim 13, wherein said processing unit supplies a drive clock signal to said stepping motor according to the phase excitation mode, a frequency of the driving clock corresponding to the W1-2 phase exciter being one fourth of a frequency of the driving clock corresponding to the 4W1-2 phase exciter.

16. A scanning apparatus according to claim 13, wherein said processing unit changes the frequency of the drive clock signal at a position where a duty ratio of the drive clock signal is 1:1.

17. A scanning apparatus according to claim 13, wherein the third position is apart from a document scanning start position in a distance to stabilize the carriage after the phase excitation mode of said stepping motor is changed.

18. A scanning apparatus according to claim 13, wherein the first speed is the fastest driving speed of the carriage.

19. A scanning apparatus according to claim 13, wherein the first speed corresponds to the minimum magnification ratio set by said setting means.

20. A scanning apparatus according to claim 13, further comprising:

a sensor which detects a size of the original document placed on the document table, wherein said processing unit judges the document scanning end position according to the size of the original document detected by said sensor.

21. A scanning apparatus according to claim 13, wherein the first position, the second position and the third position are all located outside of a document scanning region of the apparatus.

22. A scanning apparatus for scanning an image on an original document placed on a document table by moving a carriage with a light source, comprising:

a stepping motor which drives the carriage with a predetermined phase excitation mode;

a scanning magnification ratio unit configured to set a scanning magnification ratio; and a processing unit which controls said stepping motor in the following manners: controlling said stepping motor to drive with a first phase excitation mode from an initial position to a first position, and controlling said stepping motor to drive with a second phase excitation mode from the first position to a document scanning end position, wherein in the first phase excitation mode the stepping motor is rotated by use of a first amount of current by a first step angle by supplying a driving clock of a first frequency, and in the second phase excitation mode the stepping motor is rotated by use of a second amount of current, smaller than the first amount of current, by a second step angle greater than the first step angle by supplying a driving clock of a second frequency higher than the first frequency.

23. A scanning apparatus for scanning an image on an original document placed on a document table by moving a carriage with a light source, comprising:

a stepping motor which drives the carriage with a predetermined phase excitation mode;

means for setting a scanning magnification ratio; and a processing unit which controls said stepping motor in the following manners: controlling said stepping motor to drive with a first phase excitation mode from an initial position to a first position, and controlling said stepping motor to drive with a second phase excitation mode from the first position to a document scanning end position wherein in the first phase excitation mode the stepping motor is rotated by use of a first amount of current by a first step angle by supplying a driving clock of a first frequency, and in the second phase excitation mode the stepping motor is rotated by use of a second amount of current, smaller than the first amount of current, by a second step angle greater than the first step angle by supplying a driving clock of a second frequency higher than the first frequency.

24. A scanning apparatus according to claim 23, wherein the first position is apart from a document scanning start position in a distance to stabilize the carriage after the phase excitation mode of said stepping motor is changed.

25. A method for driving a carriage with a light source in a scanning apparatus having a stepping motor, comprising:

accelerating the carriage to a first speed faster than a second speed, corresponding to a magnification ratio with a first phase excitation mode from an initial position to a first position by rotating the stepping motor by use of a first amount of current by a first step angle in the first phase excitation mode by supplying a driving clock of a first frequency;

driving the carriage in the first speed with the first phase excitation mode from the first position to a second position by rotating the stepping motor by use of a first amount of current by a first step angle in the first phase excitation mode by supplying a driving clock of the first frequency;

decelerating the carriage to the second speed with the first phase excitation mode from the second position to a third position by rotating the stepping motor by use of a first amount of current by a first step angle in the first phase excitation mode by supplying a driving clock of the first frequency; and driving the carriage in the second speed with a second phase excitation mode different from the first phase excitation mode from the third position to a document scanning end position by rotating the stepping motor by use of a second amount of current, smaller than the first amount of current, by a second step angle greater than the first step angle in the excitation of the second phase excitation mode by supplying a driving clock of a second frequency higher than the first frequency.

* * * * *